US012585310B1

(12) United States Patent
Shen

(10) Patent No.: US 12,585,310 B1
(45) Date of Patent: Mar. 24, 2026

(54) MULTI-FUNCTIONAL AND MULTI-FREQUENCY PARALLEL TRANSCAPACITIVE SENSING BURST FOR FOLDABLE DEVICES

(71) Applicant: Synaptics Incorporated, San Jose, CA (US)

(72) Inventor: Guozhong Shen, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/897,446

(22) Filed: Sep. 26, 2024

(51) Int. Cl.
G06F 1/16 (2006.01)
G06F 3/044 (2006.01)

(52) U.S. Cl.
CPC .......... G06F 1/1677 (2013.01); G06F 1/1652 (2013.01); G06F 1/1683 (2013.01); G06F 3/0443 (2019.05)

(58) Field of Classification Search
CPC ...... G06F 3/041; G06F 1/1677; G06F 1/1652; G06F 1/1683; G06F 3/0443
See application file for complete search history.

(56) References Cited

U.S. PATENT DOCUMENTS

| 10,268,309 | B2 * | 4/2019 | Kang | G06F 3/04166 |
| 11,144,161 | B1 * | 10/2021 | Pundak | G06F 3/0418 |
| 11,531,439 | B1 * | 12/2022 | Shen | G06F 3/04166 |
| 11,573,663 | B1 * | 2/2023 | Yun | G06F 3/0446 |
| 11,714,473 | B2 * | 8/2023 | Vandermeijden | G06F 3/0445 |
| | | | | 713/320 |
| 11,976,922 | B1 * | 5/2024 | Vandermeijden | G06F 3/0446 |
| 12,141,000 | B2 * | 11/2024 | Shen | G06F 1/1616 |
| 2013/0050144 | A1 * | 2/2013 | Reynolds | G06F 3/0445 |
| | | | | 345/174 |
| 2016/0179271 | A1 * | 6/2016 | Vandermeijden | G06F 3/04162 |
| | | | | 345/174 |
| 2018/0088633 | A1 * | 3/2018 | Whitman | G06F 1/1677 |
| 2019/0042042 | A1 * | 2/2019 | Hei | G06F 1/1652 |
| 2019/0064950 | A1 * | 2/2019 | Hsu | G06F 1/1616 |
| 2019/0121390 | A1 * | 4/2019 | Yang | G09G 3/3208 |
| 2020/0257334 | A1 * | 8/2020 | Han | H04M 1/022 |
| 2021/0141417 | A1 * | 5/2021 | Seo | G06F 1/1616 |
| 2021/0303152 | A1 * | 9/2021 | Hosur | G06F 3/044 |
| 2022/0075427 | A1 * | 3/2022 | Palmor | G06F 1/1641 |
| 2022/0130910 | A1 * | 4/2022 | Mugiraneza | G06F 3/0445 |
| 2022/0139273 | A1 * | 5/2022 | Shepelev | H10N 30/302 |
| | | | | 361/679.02 |
| 2022/0214716 | A1 * | 7/2022 | Kim | G06F 3/0443 |
| 2023/0004206 | A1 * | 1/2023 | Vandermeijden | G06F 3/0418 |
| 2023/0004274 | A1 * | 1/2023 | Shin | G06F 3/0418 |
| 2023/0039953 | A1 * | 2/2023 | Seger, Jr. | G06F 3/04886 |
| 2023/0067179 | A1 * | 3/2023 | Kim | G06F 3/03545 |

(Continued)

*Primary Examiner* — Amy Onyekaba

(74) *Attorney, Agent, or Firm* — Leydig, Voit & Mayer, Ltd.

(57) ABSTRACT

A system for performing a multi-functional and multi-frequency parallel transcapacitive sensing burst for a foldable device includes: a plurality of electrodes corresponding to a sensing region of the foldable device, the plurality of electrodes including a first set of electrodes disposed on a first side of a hinge of the foldable device and a second set of electrodes disposed on a second side of the hinge of the foldable device; and a processing system, configured to perform the multi-functional and multi-frequency parallel transcapacitive sensing burst.

20 Claims, 15 Drawing Sheets

(56)          References Cited

U.S. PATENT DOCUMENTS

| | | | |
|---|---|---|---|
| 2023/0125175 A1* | 4/2023 | Rivolta ................. | G06F 1/1616 |
| | | | 345/156 |
| 2023/0327324 A1* | 10/2023 | Seol ...................... | G06F 1/1656 |
| | | | 455/566 |
| 2024/0004499 A1* | 1/2024 | Kim ...................... | G06F 3/0447 |
| 2024/0011759 A1* | 1/2024 | Shen ..................... | G06F 1/1652 |
| 2024/0011760 A1* | 1/2024 | Shen ..................... | G06F 3/0445 |
| 2024/0061540 A1* | 2/2024 | Van Ostrand ...... | G06V 40/1365 |
| 2024/0168524 A1* | 5/2024 | Shen ..................... | G06F 3/0448 |
| 2024/0192793 A1* | 6/2024 | Lim ...................... | G06F 3/0446 |
| 2024/0201812 A1* | 6/2024 | Lee ...................... | G06F 3/0412 |
| 2024/0241598 A1* | 7/2024 | Kim ...................... | G06F 3/0446 |
| 2024/0281038 A1* | 8/2024 | Vandermeijden ..... | G06F 1/1677 |
| 2024/0281090 A1* | 8/2024 | Ku ........................ | G06F 3/0412 |
| 2025/0036245 A1* | 1/2025 | Kim ...................... | G06F 3/046 |

* cited by examiner

100

110

Processing
System

240a

220a

205a

220b

240b

212

205b

100

110 — Processing System

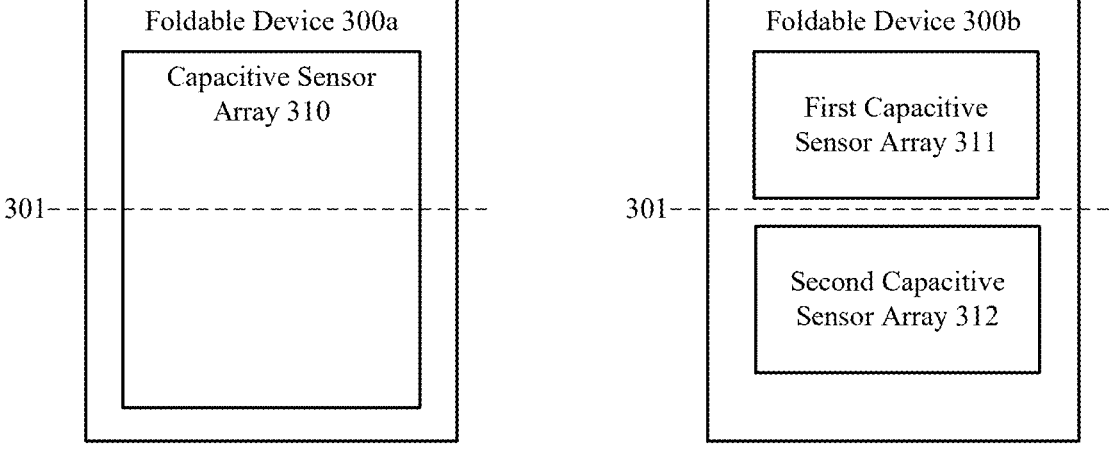
FIG. 3A                    FIG. 3B

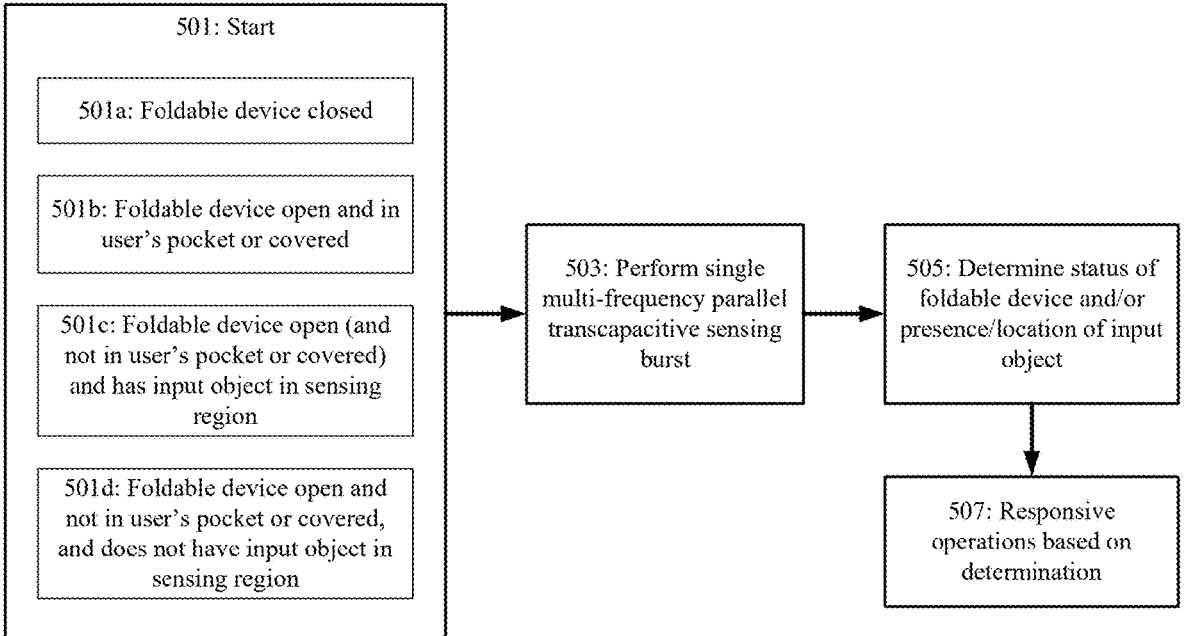

501: Start

501a: Foldable device closed

501b: Foldable device open and in user's pocket or covered

501c: Foldable device open (and not in user's pocket or covered) and has input object in sensing region 501d: Foldable device open and not in user's pocket or covered, and does not have input object in sensing region 503: Perform single multi-frequency parallel transcapacitive sensing burst 505: Determine status of foldable device and/or presence/location of input object 507: Responsive operations based on determination

FIG. 5    500

Foldable Device 600

☐ TX electrode @ first frequency f1

▨ TX electrode @ second frequency f2

▨ RX electrode

Foldable Device 600

☐ TX electrode @ first frequency f1

▨ TX electrode @ second frequency f2

▨ RX electrode

MULTI-FUNCTIONAL AND MULTI-FREQUENCY PARALLEL TRANSCAPACITIVE SENSING BURST FOR FOLDABLE DEVICES

BACKGROUND

Input devices such as touch sensor devices (also commonly called touchpads or proximity sensor devices), are widely used in a variety of electronic systems. Touch sensor devices typically include a sensing region, often demarked by a surface, in which the touch sensor device determines the presence, location and/or motion of one or more input objects, typically for purposes allowing a user to provide user input to interact with the electronic system. Another type of input device may be a touchscreen that includes a plurality of electrodes and is also capable of allowing the user to provide user input to interact with the electronic system.

In recent years, foldable devices having touchscreens or other types of capacitive sensors have been developed. However, conventional foldable devices do not utilize their capacitive sensor(s) to detect a fold angle of the foldable device because of issues such as temperature sensitivity, errors attributable to changes in display image, and heavy filtering being needed. Rather, to detect a fold angle, conventional foldable devices use a dedicated set of gyroscopic sensors and/or accelerometers. Additionally, for detecting closure of the foldable device, conventional foldable devices use a dedicated IR sensor or Hall sensor.

SUMMARY

In an exemplary embodiment, the present disclosure provides a system for performing a multi-functional and multi-frequency parallel transcapacitive sensing burst for a foldable device. The system includes: a plurality of electrodes corresponding to a sensing region of the foldable device, the plurality of electrodes including a first set of electrodes disposed on a first side of a hinge of the foldable device and a second set of electrodes disposed on a second side of the hinge of the foldable device; and a processing system, configured to perform the multi-functional and multi-frequency parallel transcapacitive sensing burst. Performing the multi-functional and multi-frequency parallel transcapacitive sensing burst comprises: driving a plurality of transmitter electrodes of the first set of electrodes with sensing signals of a first frequency; driving at least one transmitter electrode of the second set of electrodes with at least one sensing signal of a second frequency; and obtaining resulting signals via a plurality of receiver electrodes of the first set of electrodes and a plurality of receiver electrodes of the second set of electrodes, wherein the resulting signals are based on the sensing signals of the first frequency and the sensing signals of the second frequency.

In a further exemplary embodiment, the processing system is further configured to: determine that the foldable device is in a closed state based on the resulting signals obtained via the plurality of receiver electrodes of the second set of electrodes having a component corresponding to the first frequency and/or based on the resulting signals obtained via the plurality of receiver electrodes of the first set of electrodes having a component corresponding to the second frequency.

In a further exemplary embodiment, the processing system is further configured to: determine that the foldable device is to be operated in a pocket mode based on the resulting signals indicating that at least a threshold number of receiver electrodes are covered.

In a further exemplary embodiment, the processing system is further configured to: determine that an input object is present in the sensing region of the foldable device based on the resulting signals.

In a further exemplary embodiment, the processing system is further configured to: determine a location of an input object in the sensing region of the foldable device based on the resulting signals.

In a further exemplary embodiment, the processing system is configured to drive all transmitter electrodes on the first side of the hinge with the sensing signals of the first frequency and to drive all transmitter electrodes on the second side of the hinge with the sensing signals of the second frequency.

In a further exemplary embodiment, the processing system is configured to: drive all transmitter electrodes on the first side of the hinge with the sensing signals of the first frequency; and drive one or more transmitter electrodes on the second side of the hinge with the sensing signals of the first frequency and one or more other transmitter electrodes on the second side of the hinge with the sensing signals of the second frequency.

In a further exemplary embodiment, the plurality of electrodes include a sequence of transmitter electrodes and receiver electrodes arranged in a repeating pattern.

In a further exemplary embodiment, the sequence includes a single transmitter electrode, followed by a pair of receiver electrodes, followed by another single transmitter electrode followed by another pair of receiver electrodes.

In another exemplary embodiment, the present disclosure provides a method for operating a touch sensor of a foldable device. The method includes: performing, by a processing system, a multi-functional and multi-frequency parallel transcapacitive sensing burst using a plurality of electrodes corresponding to a sensing region of the foldable device, wherein the plurality of electrodes includes a first set of electrodes disposed on a first side of a hinge of the foldable device and a second set of electrodes disposed on a second side of the hinge of the foldable device. Performing the multi-functional and multi-frequency parallel transcapacitive sensing burst comprises: driving a plurality of transmitter electrodes of the first set of electrodes with sensing signals of a first frequency; driving at least one transmitter electrode of the second set of electrodes with at least one sensing signal of a second frequency; and obtaining resulting signals via a plurality of receiver electrodes of the first set of electrodes and a plurality of receiver electrodes of the second set of electrodes, wherein the resulting signals are based on the sensing signals of the first frequency and the sensing signals of the second frequency.

In a further exemplary embodiment, the method further includes: determining, by the processing system, that the foldable device is in a closed state based on the resulting signals obtained via the plurality of receiver electrodes of the second set of electrodes having a component corresponding to the first frequency and/or based on the resulting signals obtained via the plurality of receiver electrodes of the first set of electrodes having a component corresponding to the second frequency.

In a further exemplary embodiment, the method further includes: determining, by the processing system, that the foldable device is to be operated in a pocket mode based on the resulting signals indicating that at least a threshold number of receiver electrodes are covered.

In a further exemplary embodiment, the method further includes: determining, by the processing system, that an input object is present in the sensing region of the foldable device based on the resulting signals.

In a further exemplary embodiment, the method further includes: determining, by the processing system, a location of an input object in the sensing region of the foldable device based on the resulting signals.

In a further exemplary embodiment, all transmitter electrodes on the first side of the hinge are driven with the sensing signals of the first frequency, and all transmitter electrodes on the second side of the hinge are driven with the sensing signals of the second frequency.

In a further exemplary embodiment, all transmitter electrodes on the first side of the hinge are driven with the sensing signals of the first frequency; and one or more transmitter electrodes on the second side of the hinge are driven with the sensing signals of the first frequency, and one or more other transmitter electrodes on the second side of the hinge are driven with the sensing signals of the second frequency.

In a further exemplary embodiment, the plurality of electrodes include a sequence of transmitter electrodes and receiver electrodes arranged in a repeating pattern.

In a further exemplary embodiment, the sequence includes a single transmitter electrode, followed by a pair of receiver electrodes, followed by another single transmitter electrode followed by another pair of receiver electrodes.

In yet another exemplary embodiment, the present disclosure provides a non-transitory computer-readable medium having processor-executable instructions stored thereon for operating a touch sensor of a foldable device. The processor-executable instructions, when executed, facilitate performance of the following by a processing system: performing a multi-functional and multi-frequency parallel transcapacitive sensing burst using a plurality of electrodes corresponding to a sensing region of the foldable device, wherein the plurality of electrodes includes a first set of electrodes disposed on a first side of a hinge of the foldable device and a second set of electrodes disposed on a second side of the hinge of the foldable device. Performing the multi-functional and multi-frequency parallel transcapacitive sensing burst comprises: driving a plurality of transmitter electrodes of the first set of electrodes with sensing signals of a first frequency; driving at least one transmitter electrode of the second set of electrodes with at least one sensing signal of a second frequency; and obtaining resulting signals via a plurality of receiver electrodes of the first set of electrodes and a plurality of receiver electrodes of the second set of electrodes, wherein the resulting signals are based on the sensing signals of the first frequency and the sensing signals of the second frequency.

In a further exemplary embodiment, the processor-executable instructions, when executed, further facilitate performance of the following by the processing system: determining that the foldable device is in a closed state based on the resulting signals obtained via the plurality of receiver electrodes of the second set of electrodes having a component corresponding to the first frequency and/or based on the resulting signals obtained via the plurality of receiver electrodes of the first set of electrodes having a component corresponding to the second frequency: determining that the foldable device is to be operated in a pocket mode based on the resulting signals indicating that at least a threshold number of receiver electrodes are covered: determining that an input object is present in the sensing region of the foldable device based on the resulting signals; and determining a location of an input object in the sensing region of the foldable device based on the resulting signals.

BRIEF DESCRIPTION OF THE DRAWINGS

FIGS. 3A-3B are block diagrams depicting examples of foldable devices in accordance with exemplary embodiments of the present disclosure.

FIG. 5 is a flowchart 500 depicting an example process for performing a multi-functional and multi-frequency parallel transcapacitive sensing burst in accordance with an example embodiment of the present disclosure.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Exemplary devices and methods discussed herein provide for utilizing parallel transcapacitive sensing with multiple sensing frequencies to perform object detection, pocket mode detection, and open/close detection in a single sensing burst for a foldable device having touch sensing capabilities, such as a foldable mobile device having a touchscreen. The single sensing burst is thus multi-functional in the sense that it is capable of determining whether the foldable device is in a closed state, determining whether the foldable device is in a user's pocket (or otherwise covered) while open, and detect the presence and/or location of an input object (such as a user's finger) on a touchscreen of the foldable device while open, such that multiple respective sensing bursts do not need to be performed for each of these respective functions. Thus, when the foldable device is transitioned to a new state (or otherwise in a previously unknown state), example embodiments of the present disclosure provide significant time and power savings with respect to determining the state of the foldable device and/or the present and/or location of an input object in a sensing region of the foldable device.

Figure 1:
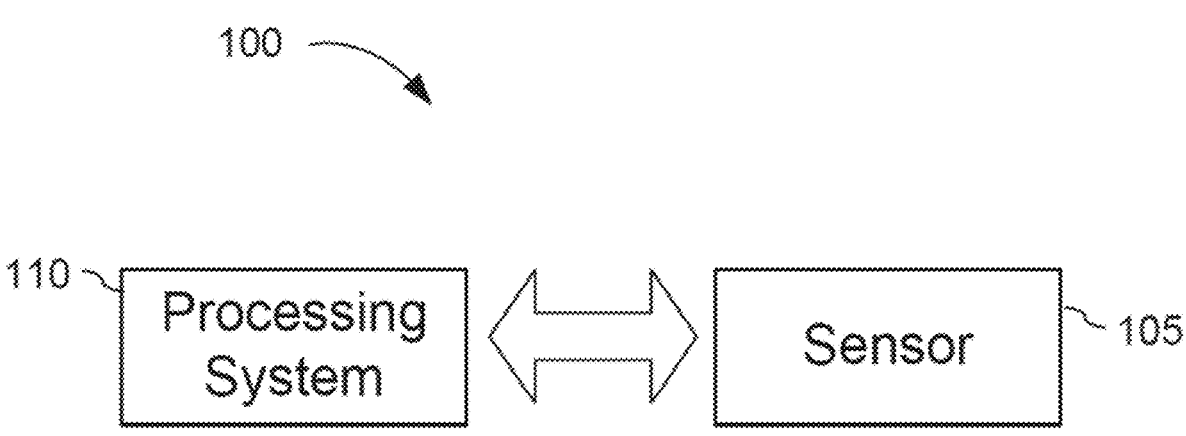
FIG. 1 is a block diagram depicting an example input device.

FIG. 1 is a block diagram depicting an example input device to illustrate the working principles of a capacitive sensor. The input device 100 may be configured to provide input to an electronic system. As used herein, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 may be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 is a capacitance (e.g., transcapacitive or absolute capacitance ("abs-cap")) input device, wherein voltage or current is applied to create an electric field. Nearby input objects cause changes in the electric field, and produce detectable changes in capacitive coupling that may be detected as changes in voltage, current, or the like.

The input device utilizes arrays or other regular or irregular patterns of capacitive sensing elements to create electric fields. In some instances, separate sensing elements may be ohmically shorted together to form larger sensor electrodes. Some other instances may utilize resistive sheets, which may be uniformly resistive.

The input device may utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive ("abs-cap") measurements.

The input device may utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented, for example, as a capacitive touch sensor having a relatively lower resolution, or as a capacitive fingerprint sensor having a relatively higher sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 mm² or less. In another exemplary embodiment, a partial placement sensor has an imaging area in the range of 20-50 mm². In some implementations, the partial fingerprint sensor has an input surface that is the same size the imaging area.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
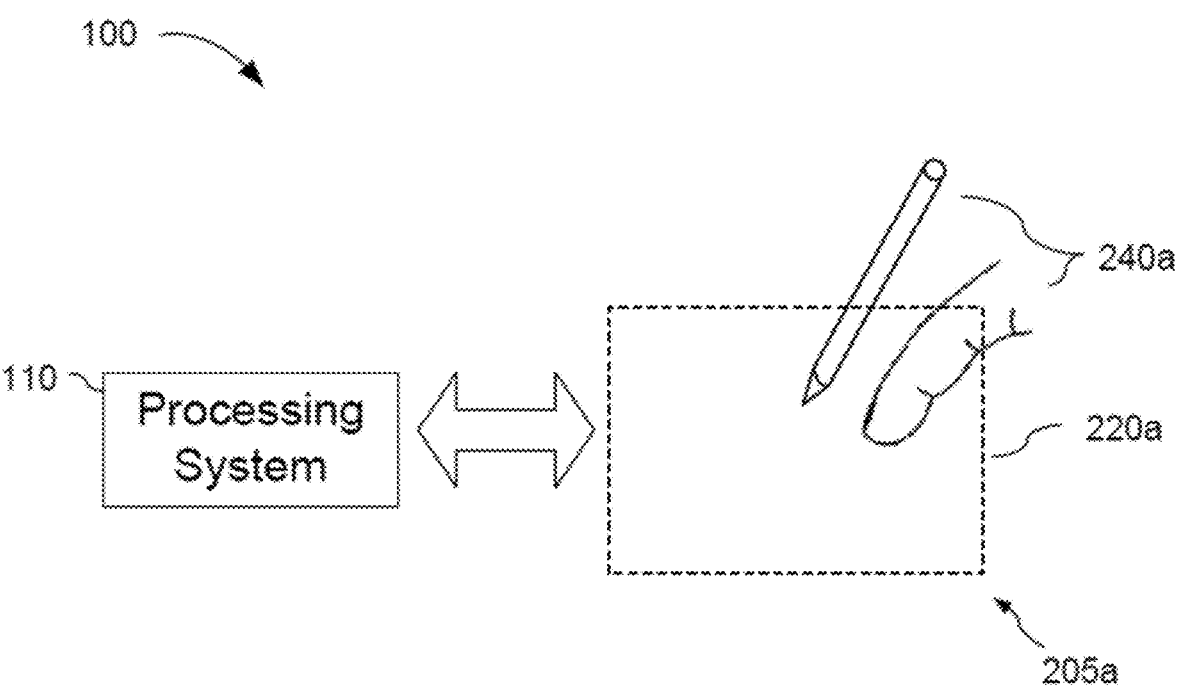
FIGS. 2A-2B are block diagrams depicting further examples of input devices.
Figure 2B:
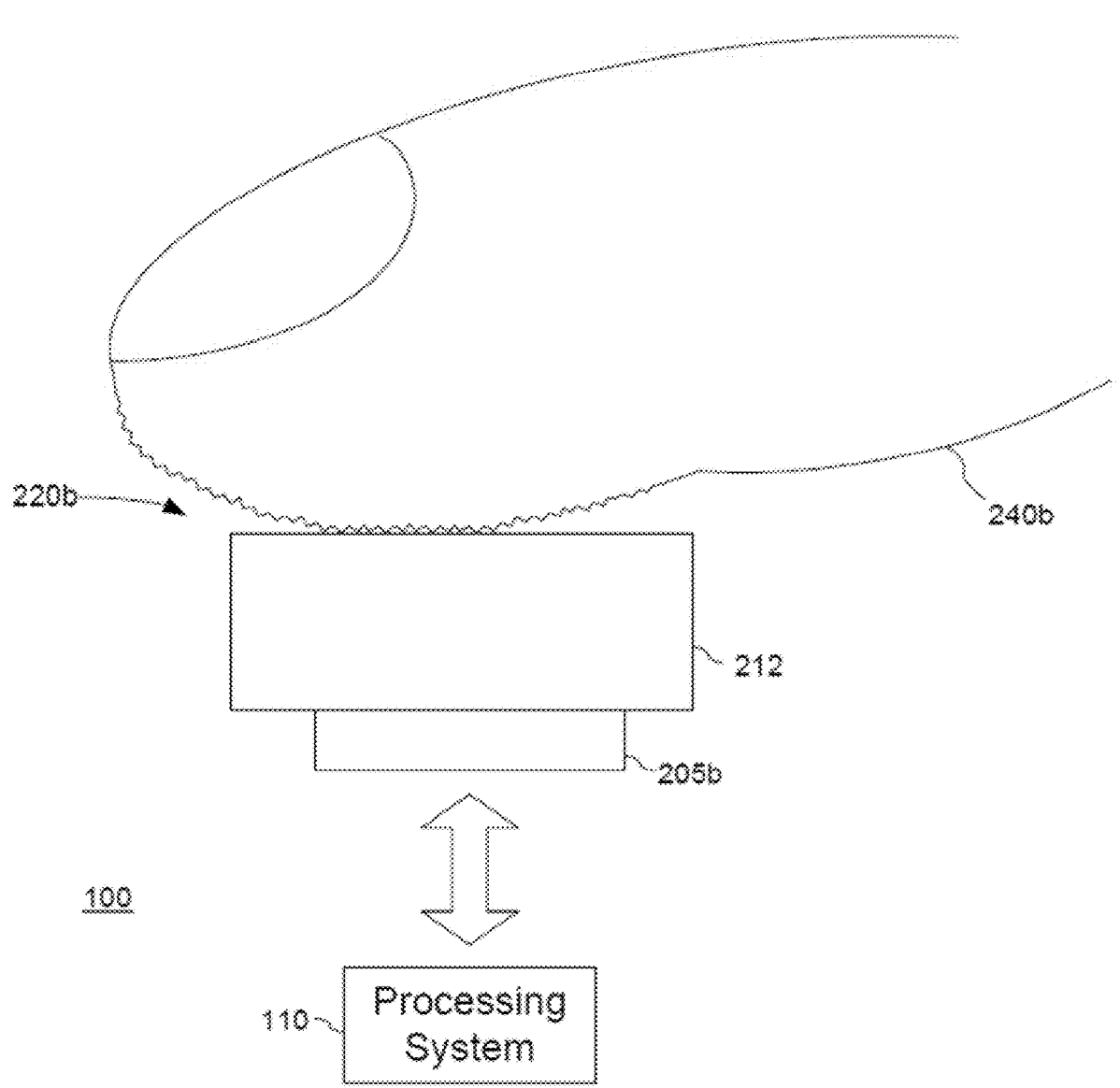

FIGS. 2A-2B are block diagrams depicting further examples of input devices to illustrate the working principles of capacitive sensors. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

FIGS. 3A-3B are block diagrams depicting examples of foldable devices in accordance with exemplary embodiments of the present disclosure. In FIG. 3A, foldable device 300a has a single capacitive sensor array 310 which spans both sides of fold line 301. Capacitive sensor array 310 may be, for example, part of a foldable touchscreen display which is part of a foldable mobile device. In FIG. 3B, foldable device 300b has multiple capacitive sensor arrays, including a first capacitive sensor array 311 on one side of fold line 301 and a second capacitive sensor array 312 on the other side of fold line 301. In one exemplary implementation, both the first and second capacitive sensor arrays 311, 312 are controlled by a single touch controller, and in another exemplary implementation, the first and second capacitive sensor arrays 311, 312 are controlled by separate touch controllers. In one exemplary implementation, both the first and second capacitive sensor arrays 311, 312 are part of respective touchscreens, and in other exemplary implementations, the first and second capacitive sensor arrays 311, 312 may be parts of different input devices (e.g., one may be a touchscreen display while the other is a touchpad or fingerprint sensor).

It will be appreciated that the foldable device depicted in FIGS. 3A-3B are merely exemplary, and that exemplary embodiments of the foldable device may be implemented with other types of foldable devices as well. For example, the principles discussed herein are also applicable to foldable devices with more than one fold line and/or more than two capacitive sensor arrays.

Figure 4A:
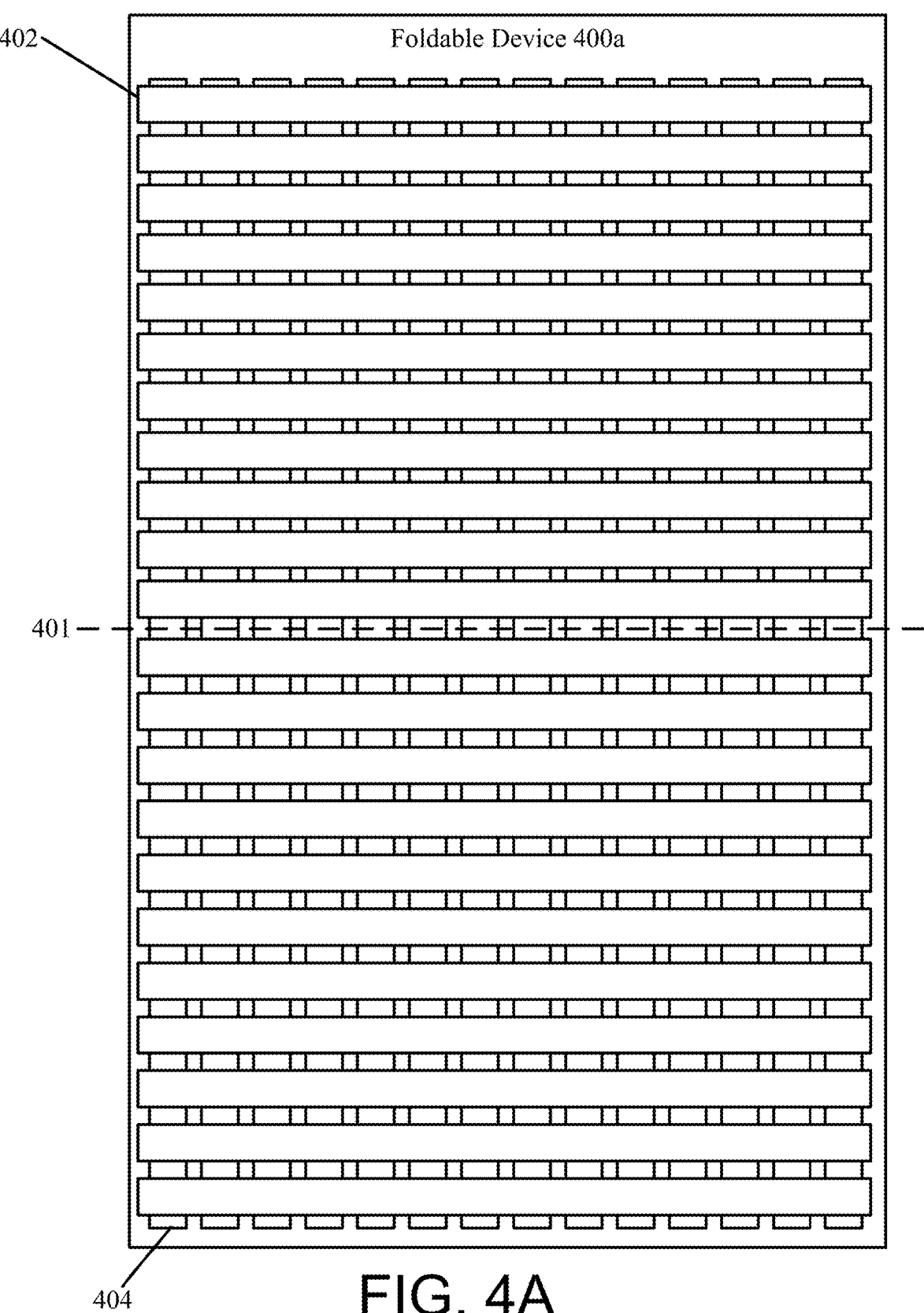
FIGS. 4A-4B depict examples of capacitive sensor arrays for exemplary foldable devices in accordance with exemplary embodiments of the present disclosure.
Figure 4B:
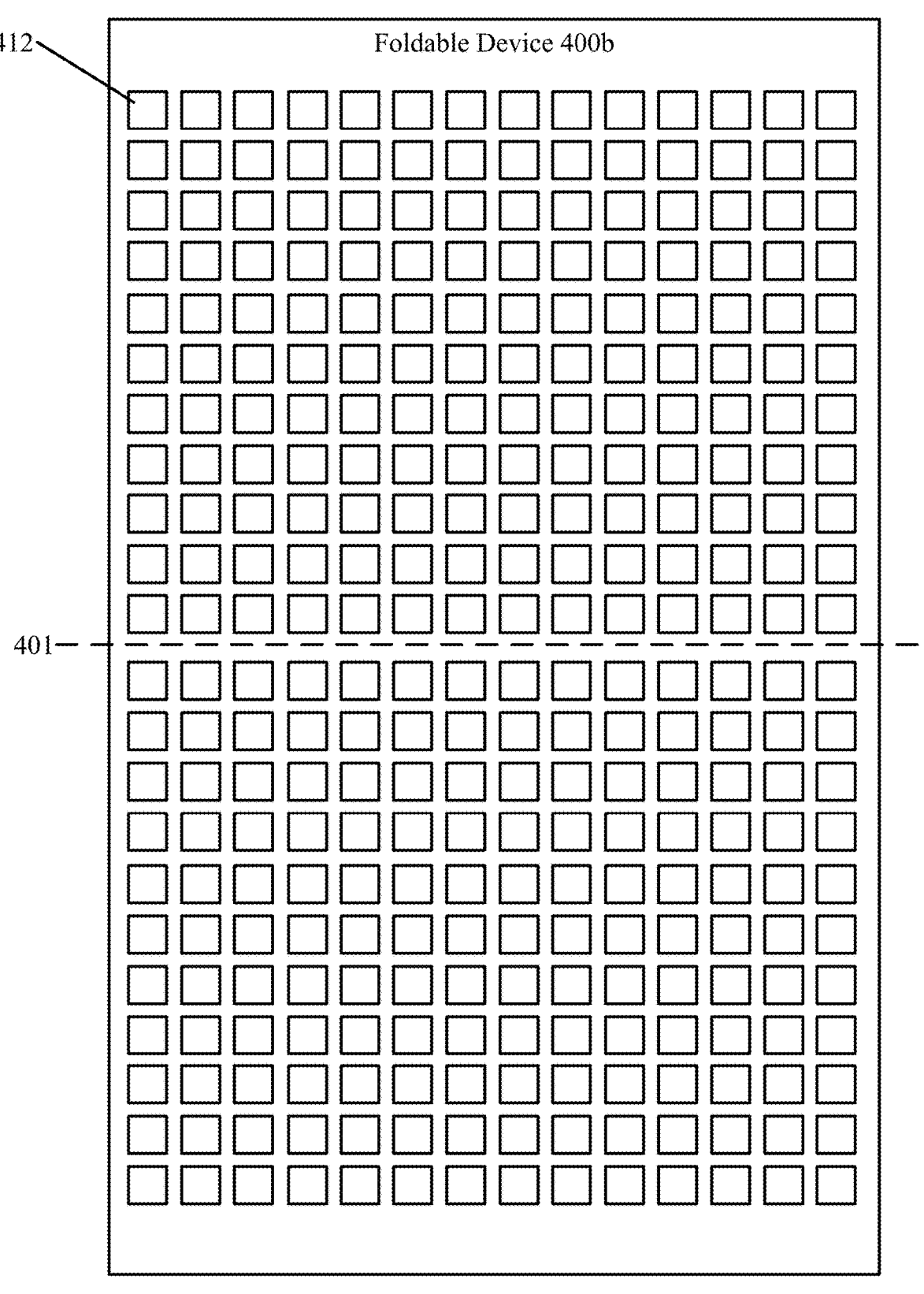

FIGS. 4A-4B depict examples of capacitive sensor arrays for exemplary foldable devices in accordance with exemplary embodiments of the present disclosure. In FIG. 4A, foldable device 400a includes a multi-layer metal mesh (MM) array of rectangular sensor electrodes in a bars-and-stripes pattern which spans across fold line 401. Thus, sensor electrodes depicted in FIG. 4A correspond to an exemplary implementation of the capacitive sensor array 310 of FIG. 3A. In this example, to operate the sensor electrodes for touch sensing, the horizontal electrodes 402 may be operated as receiver (Rx) electrodes and the vertical electrodes

404 may be operated as transmitter (Tx) electrodes, such that based on driving the Tx electrodes with sensing signals, resulting signals are obtained via the Rx electrodes which provide capacitive touch sensing information for each intersection between respective Tx and Rx electrodes. It will be appreciated that electrodes depicted in FIG. 4A may also be operated in an absolute capacitance manner (for example, as discussed below with regard to detecting a fold angle).

In FIG. 4B, foldable device 400b includes a single-layer metal mesh (MM) array of sensor electrodes in the form of sensing pads 412. The sensing pads 412 are disposed on both sides of fold line 401. In one implementation, the sensing pads 412 are all part of a single capacitive sensor array (see capacitive sensor array 310 of FIG. 3A), and in another implementation, the sensing pads 412 above the fold line 401 are part of a first capacitive sensor array and the sensing pads 412 below the fold line 401 are part of a second capacitive sensor array (see first and second capacitive sensor arrays 311, 312 of FIG. 3B). For abs-cap sensing using the sensing pads 412, each respective sensing pad 412 is driven and a resulting signal is obtained therefrom, thereby providing capacitive touch sensing information for each sensing pad location.

FIG. 5 is a flowchart 500 depicting an example process for performing a multi-functional and multi-frequency parallel transcapacitive sensing burst in accordance with an example embodiment of the present disclosure. Stage 501 corresponds to a starting situation corresponding to a foldable device. Examples of possible starting situations may include: the hinge of the foldable device being shut such that the foldable device is in a closed state (501a); the foldable device being open but disposed in a user's pocket or otherwise in a covered state (501b); the foldable device being open (and not in user's pocket or otherwise covered, such that pocket mode conditions are not met) and has an input object in its touch sensing region (501c); or the foldable device open (and not in user's pocket or otherwise covered so as to fulfill pocket mode conditions) and does not have any input object in its touch sensing region (501d).

At stage 503, a processing system of the foldable device performs a single multi-frequency and multi-functional parallel transcapacitive sensing burst in which a plurality of transmitter electrodes are driven with a plurality of sensing signals. The plurality of sensing signals include at least one sensing signal of a first frequency being driven onto a transmitter electrode on a first side of a fold line of the foldable device and at least one sensing signal of a second frequency being driven onto a transmitter electrode on a second side of a fold line of the foldable device.

At stage 505, based on capacitive measurements obtained via a plurality of receiver electrodes (corresponding to the sensing signals driven onto the transmitter electrodes), the processing system determines the status of the foldable device and, in the case of the foldable device being open and an input object being present, the processing system further determines the presence and/or location of the input object. For example, at stage 505, it may be determined that: the foldable device is in a closed state (501a); the foldable device being open but disposed in a user's pocket or otherwise in a covered state (501b); the foldable device being open (and not in user's pocket or otherwise covered so as to fulfill pocket mode conditions) and has an input object in its touch sensing region (501c); or the foldable device open (and not in user's pocket or otherwise covered so as to fulfill pocket mode conditions) and does not have any input object in its touch sensing region (501d). And in the case of the foldable device being open (and not in user's pocket or otherwise covered so as to fulfill pocket mode conditions) and having an input object in its touch sensing region (501*c*), the presence and/or location of the input object may also be determined in stage 505.

At stage 507, further operations may be performed (e.g., by the processing system or by another device in communication with the processing system) in response to the determination(s) at stage 505. For example:

In the case of the foldable device being closed (501*a*), the foldable device may be operated in a low power, closed mode where a simple open/close detection operation is periodically performed, or a single multi-frequency parallel transcapacitive sensing burst (503) is periodically performed. For simple open/close detection, a smaller number of electrodes may be used relative to performing a single multi-frequency parallel transcapacitive sensing burst. For example, only one or two transmitter electrodes proximate to an edge of the sensing region may be driven with sensing signals, and based on resulting signals obtained via receiver electrode(s) opposite to the driven transmitter electrode(s), the processing system determines whether or not the foldable device is still closed or whether it has been opened.

In the case of the foldable device being open and detected as being in a user's pocket (such as when it is detected that a certain threshold amount of the sensing region is covered), the foldable device is operated in a pocket mode where certain operations may be disabled, such as touch reporting and baseline updating.

In the case of the foldable device being open and an input object being in the sensing region (501*c*), the foldable device may perform a further step of touch detection to determine the location of the input object more precisely (e.g., in two dimensions and/or at higher resolution), as well as perform motion tracking for the input object.

In the case of the foldable device being open and an input object not being in the sensing region (501*d*), the foldable device may perform a periodic presence detection operation or a periodic multi-frequency parallel transcapacitive sensing burst. In the case of periodic multi-frequency parallel transcapacitive sensing bursts being performed both in state 501*a* and state 501*d*, the frequency of the periodic sensing bursts may be relatively more frequent in stage 501*d* than in state 501*a*.

FIGS. 6A-6D depict example schematic diagrams showing a portion of the electrodes of a capacitive sensor array to illustrate the working principles of a multi-functional and multi-frequency sensing burst in accordance with an example embodiment of the present disclosure.

Figure 6A:
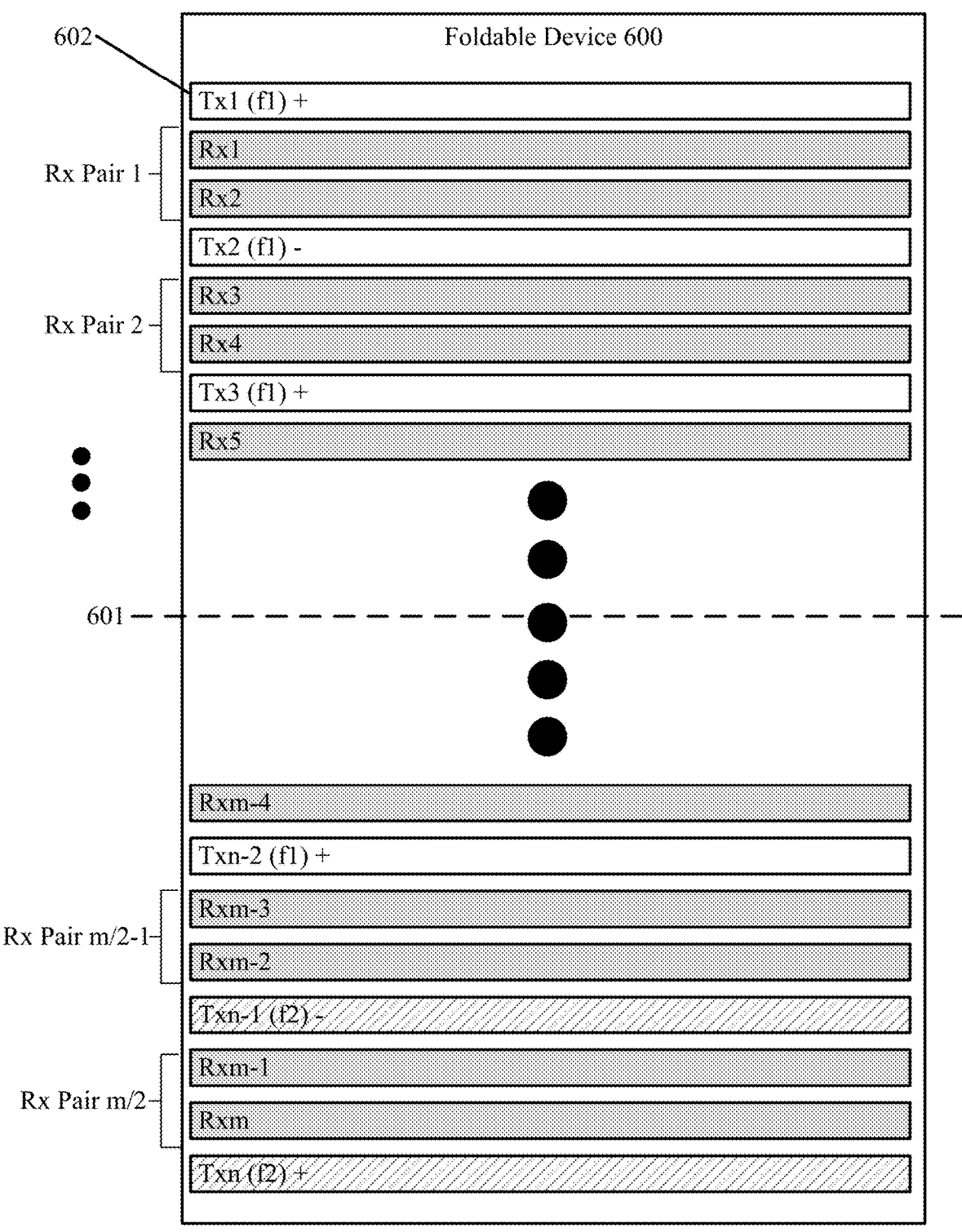
FIGS. 6A-6D depict example schematic diagrams showing a portion of the electrodes of a capacitive sensor array to illustrate the working principles of a multi-functional and multi-frequency sensing burst in accordance with an example embodiment of the present disclosure.

As shown in FIG. 6A, foldable device 600 may include both horizontal and vertical electrodes (similar to foldable device 400*a* depicted in FIG. 4A), but for the purposes of a multi-frequency parallel transcapacitive sensing burst performed in accordance with an example embodiment of the present disclosure, only the horizontal electrodes may be utilized. Thus, for simplicity of depiction, only the horizontal electrodes 602 are depicted in FIG. 6A.

Each horizontal electrode may be operated as a transmitter electrode or a receiver electrode (or may be operated as a guard or ground electrode). In the example of FIG. 6A, for the top half of the sensor array above the fold line 601, the sensor electrodes are operated according to a repeating pattern whereby a plurality of receiver electrodes form differential pairs to minimize or eliminate noise. For example, Tx1 is driven with a sensing signal having a first frequency f1 with positive polarity, and Tx2 is driven with a first frequency f1 with negative polarity, such that a capacitive measurement obtained via Rx1, which is proximate to Tx1, corresponds to the sensing signal having the first frequency f1 with positive polarity, and such that a capacitive measurement obtained via Rx2, which is proximate to Tx2, corresponds to the sensing signal having the first frequency f1 with negative polarity. The processing system may then utilize the measurements from Rx Pair 1 (comprised of Rx1 and Rx2) to cancel out noise which is common to both Rx1 and Rx2 based on the respective positive and negative polarity sensing signals driven onto Tx1 and Tx2. Rx Pair 2 is operated in a similar manner, with Rx3 providing a capacitive measurement corresponding to the negative polarity sensing signal driven onto Tx2, and with Rx4 providing a capacitive measurement corresponding to the positive polarity sensing signal driven onto Tx3, such that the processing system is able to cancel out noise from capacitive measurements corresponding to Rx3 and Rx4.

U.S. application Ser. No. 18/643,808, filed Apr. 23, 2024, describes the use of differential pairs of receiver electrodes in a parallel transcapacitance sensing scheme to minimize or eliminate noise and is incorporated by reference herein in its entirety.

In the example depicted in FIG. 6A, the sensor array of foldable device 600 may include n electrodes being operated as transmitter electrodes and m electrodes being operated as receiver electrodes. And in case of all receiver electrodes being part of a differential Rx pair, there are a total of m/2 Rx pairs.

Figure 6B:
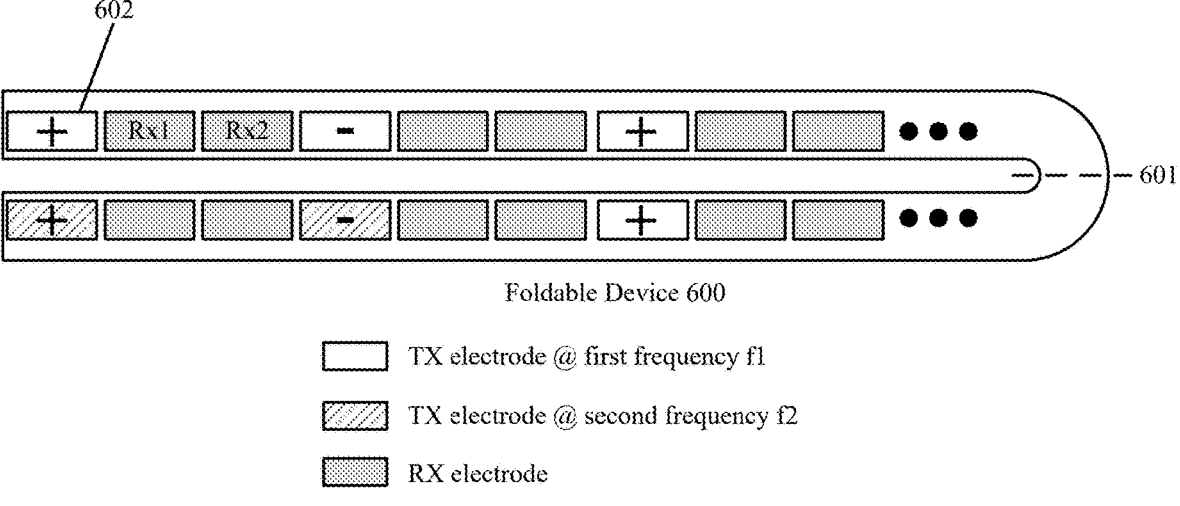

Additionally, at least one transmitter electrode on a second side of (below) fold line 601 may be driven with a sensing signal having a different frequency relative to the frequency of a sensing signal driven onto at least one transmitter electrode on a first side of (above) fold line 601. In the depicted example of FIG. 6A, two transmitter electrodes Txn and Txn−1 are driven with sensing signals having frequency f2 and with positive and negative polarities, respectively. Thus, as shown in FIG. 6B, when the foldable device 600 is in a closed state, the resulting signals obtained via Rx1 and Rx2 will include components corresponding to the first frequency f1 and components corresponding to the second frequency f2, given the proximity of Rx1/Rx2 to both Tx1/Tx2 and Txn/Txn−1 while the foldable device is closed. Thus, based on the processing system determining that the resulting signals received via Rx1/Rx2 include a second frequency f2 component above a threshold level, the processing system may determine that the foldable device is in a closed state, and based on the processing system determining that the resulting signals received via Rx1/Rx2 lack a second frequency f2 component (or have a second frequency f2 component below a threshold level), the processing system may determine that the foldable device is in an open state.

Similarly, open/closed detection may additionally or alternately be performed using Rx Pair m/2 (e.g., in the case of there being 44 receiver electrodes (m=44), Rx Pair m/2 refers to Rx Pair 22). If the processing system determines that the resulting signals received via Rxm/Rxm−1 include a first frequency f1 component above a threshold level, the processing system may determine that the foldable device is in a closed state, and based on the processing system determining that the resulting signals received via Rxm/Rxm−1 lack a first frequency f1 component (or have a first frequency f1 component below a threshold level), the processing system may determine that the foldable device is in an open state.

Figure 6C:
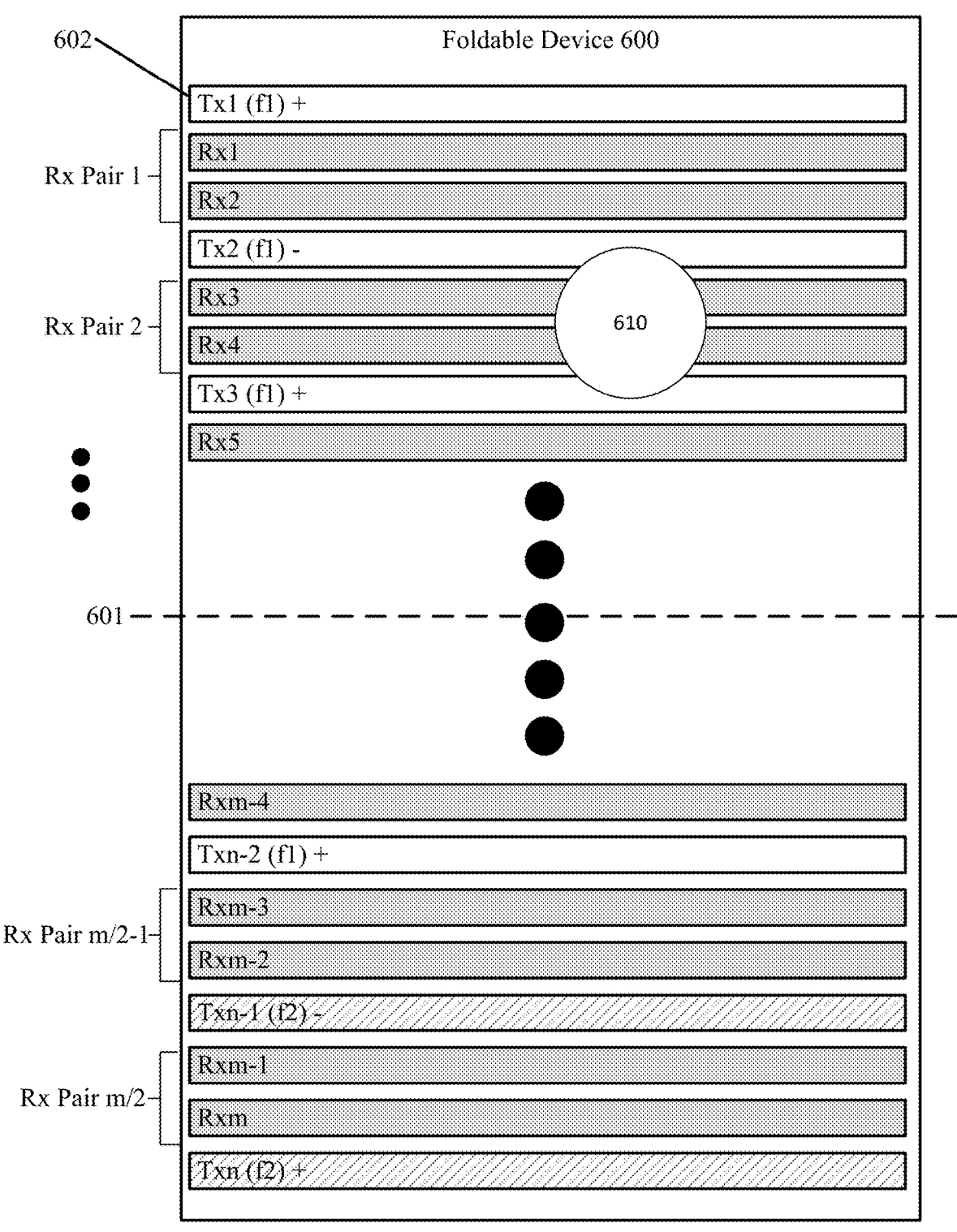

FIG. 6C depicts an example situation in which an input object 610 (such as a user's finger) is disposed in a sensing region of the sensor array proximate to Rx3 and Rx4. The presence of the input object 610 affects the capacitance between Tx2 (f1)– and Rx3 as well as the capacitance between Rx3 (f1)+ and Rx4, and thus, based on resulting signals obtained via Rx3 and Rx4, the processing system is able to determine that: (1) an input object is present; and (2) the input object is located in the sensing region proximate to Rx3 and Rx4 on the y-axis (assuming the horizontal direction is defined as the x-axis and the vertical direction is defined as the x-axis).

Figure 6D:
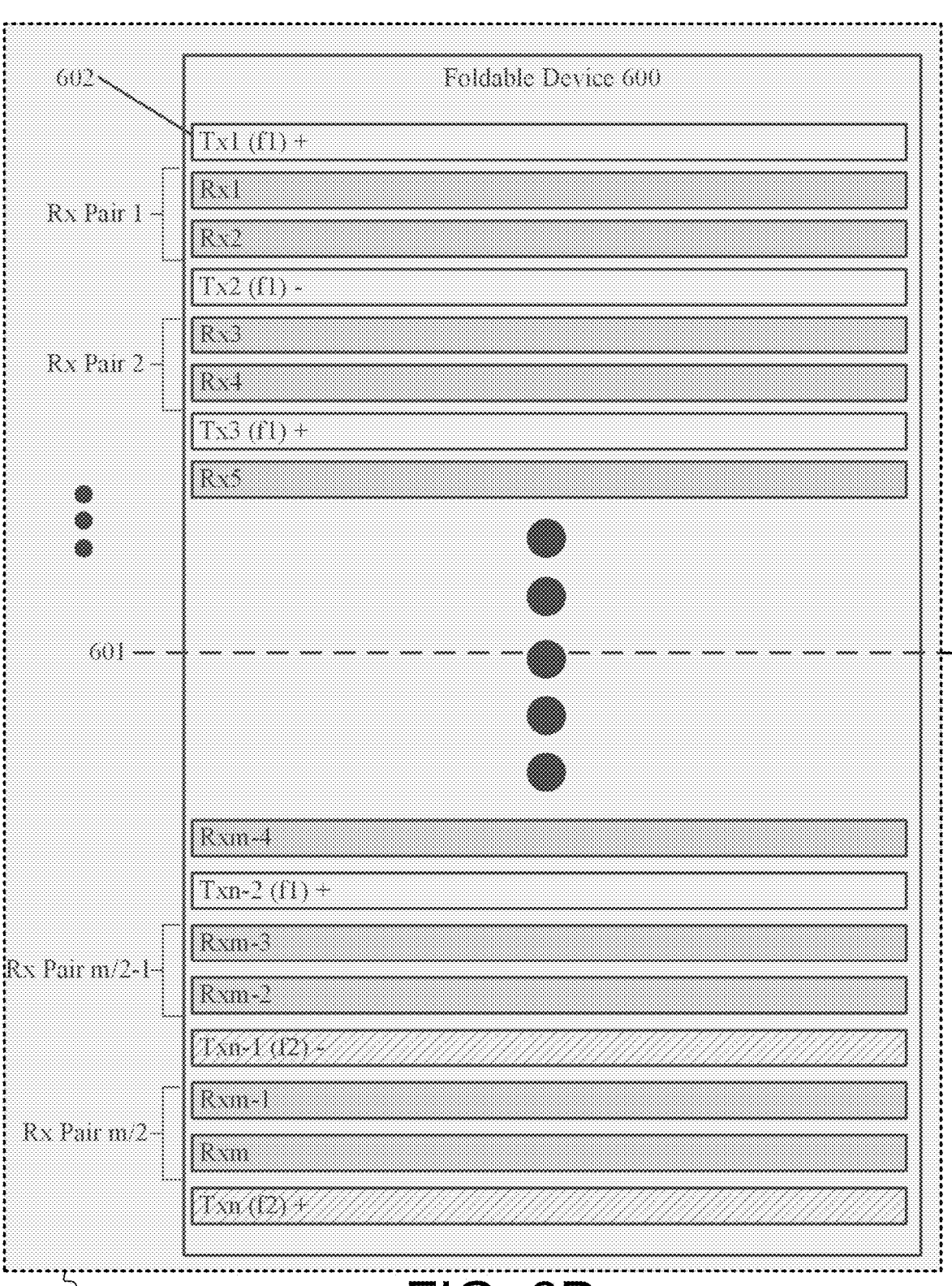

FIG. 6D depicts an example situation in which the foldable device is in a user's pocket and the sensing region is thus covered by cloth (represented by element 620). In this situation, the resulting signals obtained via receiver electrodes Rx1 to Rxm will be indicative of cloth (or the combination of cloth and the human body) touching or pressing against the sensor array, such that the processing system is able to determine, from the resulting signals, that the foldable device is open and in a user's pocket.

It will be appreciated that pocket mode detection may also be configured to be similar to palm detection, such that the foldable device will enter a pocket mode in response to detecting coverage of the sensing region above a certain pocket mode threshold. For example, the pocket mode threshold may be set to correspond to coverage of a certain number of receiver electrodes, wherein the number of receiver electrodes is larger than that which would be covered by a finger).

Figure 7:
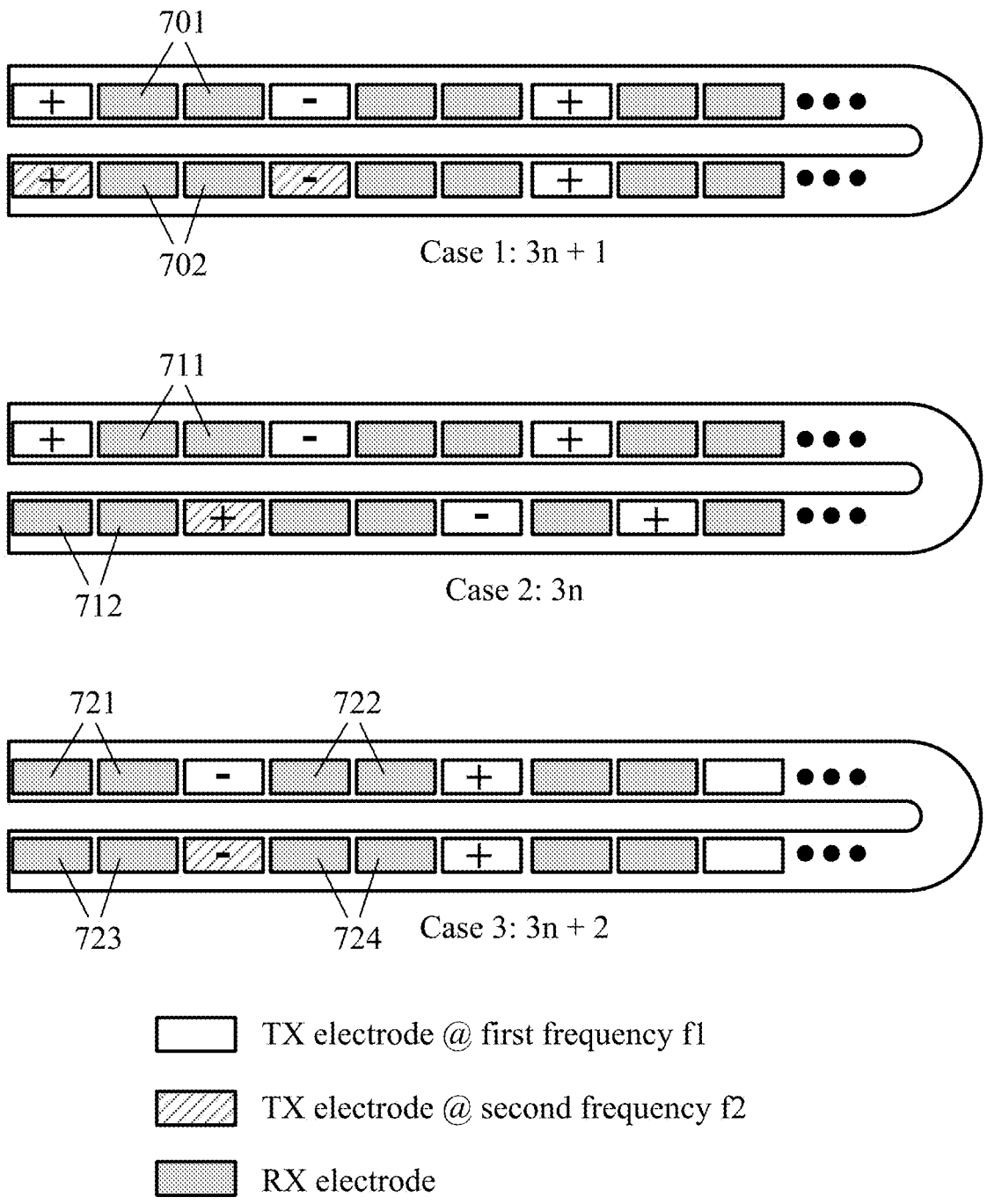
FIG. 7 depict example schematic diagrams showing a portion of the electrodes of a capacitive sensor array to illustrate the working principles of a multi-functional and multi-frequency sensing burst in accordance with other example embodiments of the present disclosure.

Different foldable devices may have different numbers of receiver electrodes in their respective sensing regions. The example shown in FIGS. 6A-6D has a number of electrodes corresponding to 3*n+1, as there is a repeating pattern of TX, RX, RX from top-to-bottom with an additional TX at the end. This is shown in Case 1 of FIG. 7. FIG. 7 also shows two other cases, Case 2 corresponding to a foldable device having a number of electrodes 3*n, and Case 3 corresponding to a foldable device having a number of electrodes 3*n+2.

As discussed above with respect to FIGS. 6A-6B, for Case 1 of FIG. 7, when the foldable device is closed, resulting signals received via Rx pair 701 indicate that the foldable device is closed based on the sensing signals of frequency f2 driven onto + and − transmitter electrodes on the opposite side of the foldable device. Similarly, resulting signals received via Rx pair 702 indicate that the foldable device is closed based on the sensing signals of frequency f1 driven onto transmitter electrodes on the opposite side of the foldable device.

For Case 2 of FIG. 7, resulting signals received via Rx pair 711 indicate that the foldable device is closed based on the sensing signals of frequency f2 driven onto a + transmitter electrode on the opposite side of the foldable device. Similarly, resulting signals received via Rx pair 712 indicate that the foldable device is closed based on the sensing signals of frequency f1 driven onto a + transmitter electrode on the opposite side of the foldable device.

For Case 3 of FIG. 7, resulting signals received via Rx pair 721 and/or RX pair 722 indicate that the foldable device is closed based on the sensing signals of frequency f2 driven onto a − transmitter electrode on the opposite side of the foldable device. Similarly, resulting signals received via Rx pairs 723 and 724 indicate that the foldable device is closed based on the sensing signals of frequency f1 driven onto a − transmitter electrode on the opposite side of the foldable device.

Figure 8A:
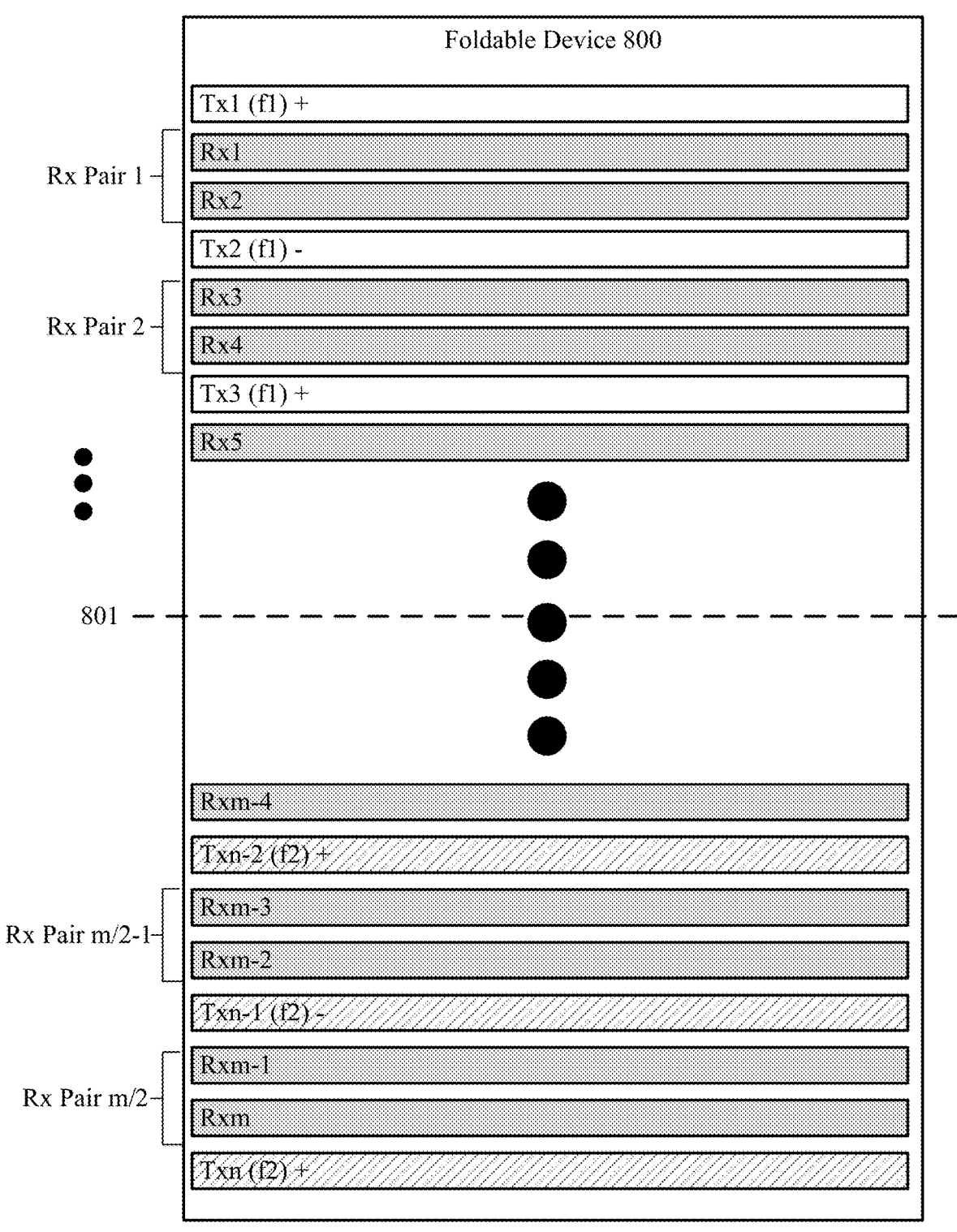
FIGS. 8A-8B depict example schematic diagrams showing a portion of the electrodes of a capacitive sensor array to illustrate the working principles of a multi-functional and multi-frequency sensing burst in accordance with another example embodiment of the present disclosure.
Figure 8B:
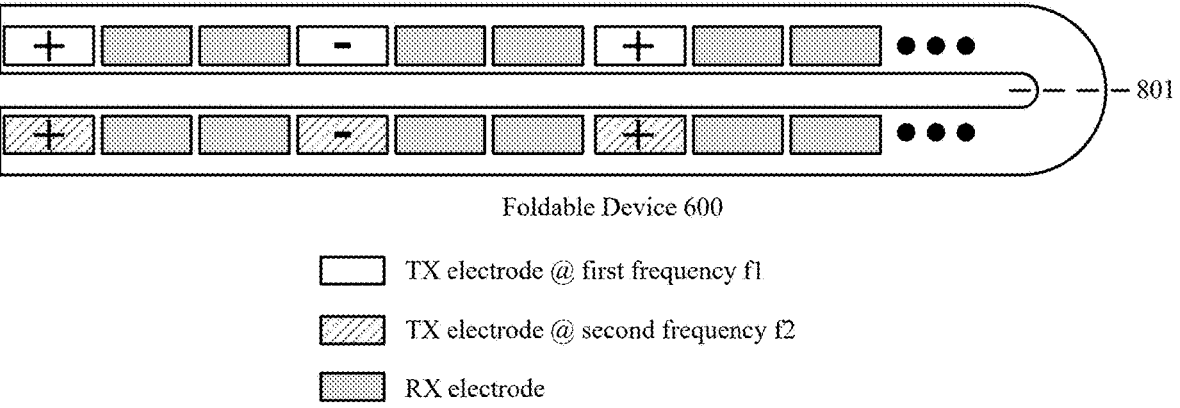

FIGS. 8A-8B depict example schematic diagrams showing a portion of the electrodes of a capacitive sensor array to illustrate the working principles of a multi-functional and multi-frequency sensing burst in accordance with another example embodiment of the present disclosure. In these examples, the processing system of foldable device 800 drives transmitter electrodes with sensing signals having a first frequency f1 on a first side of the hinge 801, and for the second side of the hinge 801, all transmitter electrodes are driven with sensing signals having a second frequency f2 (in contrast to FIGS. 6A-6B, for which some transmitter electrodes on the second side of the hinge are driven with sensing signals of the first frequency f1 and some transmitter electrodes on the second side of the hinge are driven with sensing signals of the second frequency f2). In the example embodiment shown in FIGS. 8A-8B, any pair of RX electrodes on either side of the hinge can be used for open/closed detection, as each pair of RX electrodes on the first side of the hinge will be affected by sensing signals of frequency f2 in the closed state, and each pair of RX electrodes on the second side of the hinge will be affected by sensing signals of frequency f1 in the closed state.

It will be appreciated that the TX/RX electrode configurations shown in the foregoing figures are merely exemplary, and that other combinations of TX and RX electrodes may be used in accordance with embodiments of the present disclosure. For example, the TX or RX electrodes may be disposed in different locations from those depicted while still providing the same or similar capabilities and results.

Figure 9A:
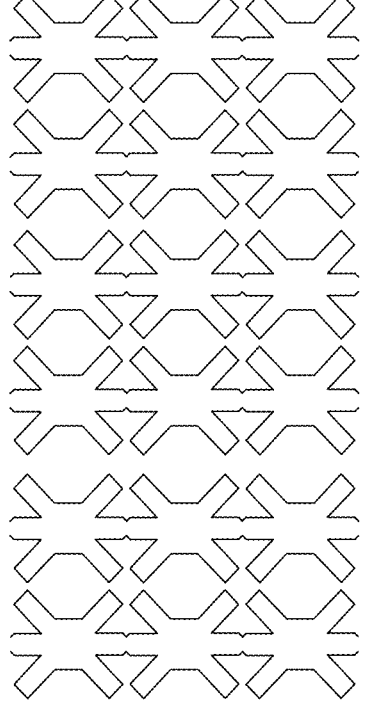
FIGS. 9A-9B depict additional example shapes of RX and TX electrodes, respectively.
Figure 9B:
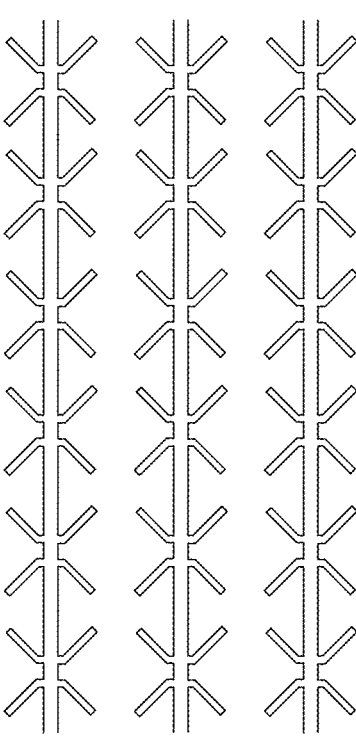

Additionally, it will be appreciated that although the depicted examples show bars- and -stripes electrode configurations for simplicity, in practice, a plurality of different type of electrode shapes and configurations may be used. A person of ordinary skill in the art would understand that many different types of special electrode shapes (e.g., designed to be optimized for specific respective devices) behave in a manner analogous to bars-and-stripes electrodes, and the principles discussed herein are applicable to all such variations of electrode shapes and configurations. For example, FIG. 9A depicts an example shape for 6 RX electrodes, and FIG. 9B depicts an example shape for 3 TX electrodes (which may be disposed beneath the 6 RX electrodes of FIG. 9A), and these electrodes depicted in FIGS. 9A-9B conceptually behave in a manner analogous to bars-and-stripes electrodes such that the principles discussed herein are applicable thereto. Further, as discussed above, the principles discussed herein may also be applied to an electrode configuration having a plurality of sensing pads as shown in FIG. 4B (e.g., sensing pads may be connected together and operated in a transcapacitive manner).

Additionally, it will be appreciated that sensing electrodes utilized in embodiments of the present disclosure (such as the sensing electrodes depicted in FIGS. 4A-4B and FIGS. 9A-9B), whether configured in a bars-and-stripes configuration or other configuration, may be solid conductors, mesh conductors, a mix of solid and mesh, or may involve other metal patterns. For example, for an OLED on-cell sensor, the sensing electrodes may be metal mesh to provide openings for LED light to pass through.

It will further be appreciated that, in the exemplary embodiments discussed herein, the sensor electrodes utilized for obtaining absolute capacitance measurements for fold angle detection and the sensor electrodes utilized for obtaining transcapacitive measurements for open/closed detection are advantageously sensor electrodes of a plurality of touch sensing sensor electrodes of the foldable device which are also used for performing touch sensing (i.e., a processing system of the foldable device, during touch sensing operation, obtains touch sensing measurements via the touch sensing sensor electrodes and determines a position of an input object in a sensing region corresponding to the plurality of electrodes).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for performing a multi-functional and multi-frequency parallel transcapacitive sensing burst for a foldable device, comprising:
a plurality of electrodes corresponding to a sensing region of the foldable device, the plurality of electrodes including a first set of electrodes disposed on a first side of a hinge of the foldable device and a second set of electrodes disposed on a second side of the hinge of the foldable device; and
a processing system; configured to perform the multi-functional and multi-frequency parallel transcapacitive sensing burst, wherein performing the multi-functional and multi-frequency parallel transcapacitive sensing burst comprises:
driving a plurality of transmitter electrodes of the first set of electrodes with sensing signals of a first frequency;
driving at least one transmitter electrode of the second set of electrodes with at least one sensing signal of a second frequency; and
obtaining resulting signals via a plurality of receiver electrodes of the first set of electrodes and a plurality of receiver electrodes of the second set of electrodes, wherein the resulting signals are based on the sensing signals of the first frequency and the sensing signals of the second frequency;
wherein the processing system is configured to:
drive all transmitter electrodes on the first side of the hinge with the sensing signals of the first frequency; and
drive one or more transmitter electrodes on the second side of the hinge with the sensing signals of the first frequency and one or more other transmitter electrodes on the second side of the hinge with the sensing signals of the second frequency.

2. The system according to claim 1, wherein the processing system is further configured to:
determine that the foldable device is in a closed state based on the resulting signals obtained via the plurality of receiver electrodes of the second set of electrodes having a component corresponding to the first frequency and/or based on the resulting signals obtained via the plurality of receiver electrodes of the first set of electrodes having a component corresponding to the second frequency.

3. The system according to claim 1, wherein the processing system is further configured to:
determine that the foldable device is to be operated in a pocket mode based on the resulting signals indicating that at least a threshold number of receiver electrodes are covered.

4. The system according to claim 1, wherein the processing system is further configured to:
determine that an input object is present in the sensing region of the foldable device based on the resulting signals.

5. The system according to claim 1, wherein the processing system is further configured to:
determine a location of an input object in the sensing region of the foldable device based on the resulting signals.

6. The system according to claim 1, wherein the plurality of electrodes include a sequence of transmitter electrodes and receiver electrodes arranged in a repeating pattern.

7. The system according to claim 6, wherein the sequence includes a single transmitter electrode, followed by a pair of receiver electrodes, followed by another single transmitter electrode followed by another pair of receiver electrodes.

8. A method for operating a touch sensor of a foldable device, comprising:
performing, by a processing system, a multi-functional and multi-frequency parallel transcapacitive sensing burst using a plurality of electrodes corresponding to a sensing region of the foldable device, wherein the plurality of electrodes includes a first set of electrodes disposed on a first side of a hinge of the foldable device and a second set of electrodes disposed on a second side of the hinge of the foldable device;

wherein performing the multi-functional and multi-frequency parallel transcapacitive sensing burst comprises:

driving a plurality of transmitter electrodes of the first set of electrodes with sensing signals of a first frequency;

driving at least one transmitter electrode of the second set of electrodes with at least one sensing signal of a second frequency; and obtaining resulting signals via a plurality of receiver electrodes of the first set of electrodes and a plurality of receiver electrodes of the second set of electrodes, wherein the resulting signals are based on the sensing signals of the first frequency and the sensing signals of the second frequency;

wherein all transmitter electrodes on the first side of the hinge are driven with the sensing signals of the first frequency; and wherein one or more transmitter electrodes on the second side of the hinge are driven with the sensing signals of the first frequency, and one or more other transmitter electrodes on the second side of the hinge are driven with the sensing signals of the second frequency.

9. The method according to claim 8, further comprising: determining, by the processing system, that the foldable device is in a closed state based on the resulting signals obtained via the plurality of receiver electrodes of the second set of electrodes having a component corresponding to the first frequency and/or based on the resulting signals obtained via the plurality of receiver electrodes of the first set of electrodes having a component corresponding to the second frequency.

10. The method according to claim 8, further comprising: determining, by the processing system, that the foldable device is to be operated in a pocket mode based on the resulting signals indicating that at least a threshold number of receiver electrodes are covered.

11. The method according to claim 8, further comprising: determining, by the processing system, that an input object is present in the sensing region of the foldable device based on the resulting signals.

12. The method according to claim 8, further comprising: determining, by the processing system, a location of an input object in the sensing region of the foldable device based on the resulting signals.

13. The method according to claim 8, wherein the plurality of electrodes include a sequence of transmitter electrodes and receiver electrodes arranged in a repeating pattern.

14. The method according to claim 13, wherein the sequence includes a single transmitter electrode, followed by a pair of receiver electrodes, followed by another single transmitter electrode followed by another pair of receiver electrodes.

15. A non-transitory computer-readable medium having processor-executable instructions stored thereon for operating a touch sensor of a foldable device, wherein the processor-executable instructions, when executed, facilitate performance of the following by a processing system:

performing a multi-functional and multi-frequency parallel transcapacitive sensing burst using a plurality of electrodes corresponding to a sensing region of the foldable device, wherein the plurality of electrodes includes a first set of electrodes disposed on a first side of a hinge of the foldable device and a second set of electrodes disposed on a second side of the hinge of the foldable device;

wherein performing the multi-functional and multi-frequency parallel transcapacitive sensing burst comprises:

driving a plurality of transmitter electrodes of the first set of electrodes with sensing signals of a first frequency;

driving at least one transmitter electrode of the second set of electrodes with at least one sensing signal of a second frequency; and obtaining resulting signals via a plurality of receiver electrodes of the first set of electrodes and a plurality of receiver electrodes of the second set of electrodes, wherein the resulting signals are based on the sensing signals of the first frequency and the sensing signals of the second frequency;

wherein all transmitter electrodes on the first side of the hinge are driven with the sensing signals of the first frequency; and wherein one or more transmitter electrodes on the second side of the hinge are driven with the sensing signals of the first frequency, and one or more other transmitter electrodes on the second side of the hinge are driven with the sensing signals of the second frequency.

16. The non-transitory computer-readable medium according to claim 15, wherein the processor-executable instructions, when executed, further facilitate performance of the following by the processing system:

determining that the foldable device is in a closed state based on the resulting signals obtained via the plurality of receiver electrodes of the second set of electrodes having a component corresponding to the first frequency and/or based on the resulting signals obtained via the plurality of receiver electrodes of the first set of electrodes having a component corresponding to the second frequency;

determining that the foldable device is to be operated in a pocket mode based on the resulting signals indicating that at least a threshold number of receiver electrodes are covered;

determining that an input object is present in the sensing region of the foldable device based on the resulting signals; and determining a location of the input object in the sensing region of the foldable device based on the resulting signals.

17. The non-transitory computer-readable medium according to claim 15, wherein the processor-executable instructions, when executed, further facilitate performance of the following by the processing system:

determining that the foldable device is in a closed state based on the resulting signals obtained via the plurality of receiver electrodes of the second set of electrodes having a component corresponding to the first frequency and/or based on the resulting signals obtained via the plurality of receiver electrodes of the first set of electrodes having a component corresponding to the second frequency.

18. The non-transitory computer-readable medium according to claim 15, wherein the processor-executable instructions, when executed, further facilitate performance of the following by the processing system:

determining that the foldable device is to be operated in a pocket mode based on the resulting signals indicating that at least a threshold number of receiver electrodes are covered.

19. The non-transitory computer-readable medium according to claim 15, wherein the processor-executable instructions, when executed, further facilitate performance of the following by the processing system:

determining that an input object is present in the sensing region of the foldable device based on the resulting signals.

20. The non-transitory computer-readable medium according to claim 15, wherein the processor-executable instructions, when executed, further facilitate performance of the following by the processing system:

determining a location of an input object in the sensing region of the foldable device based on the resulting signals.

\* \* \* \* \*